Patented Sept. 16, 1952

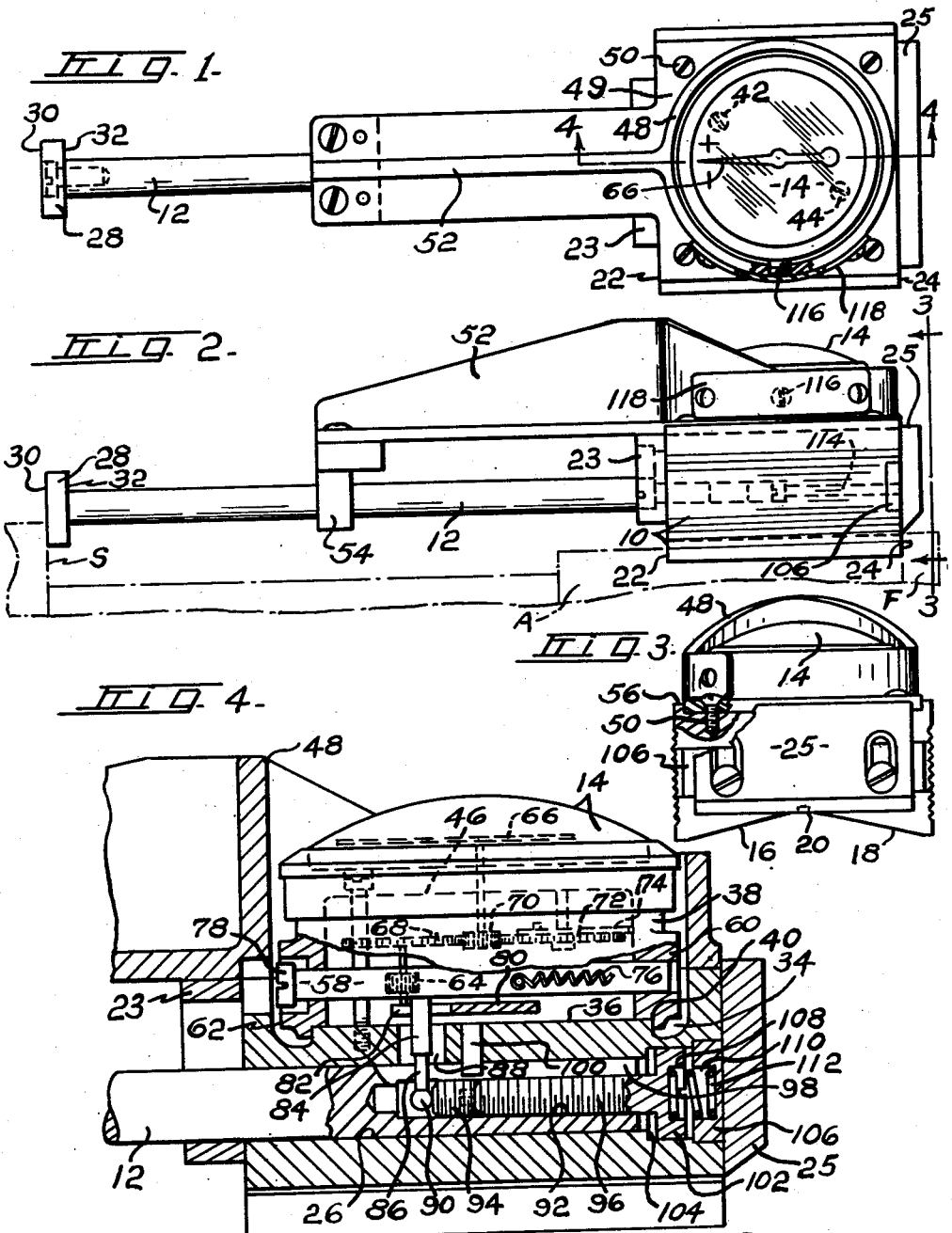

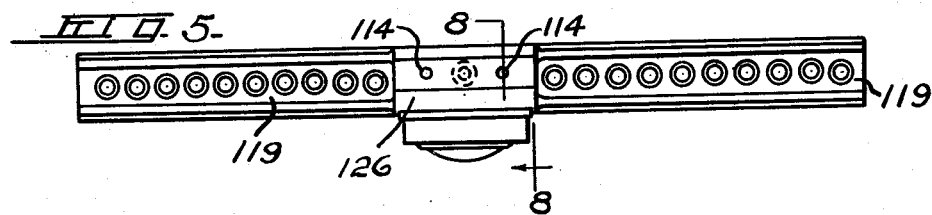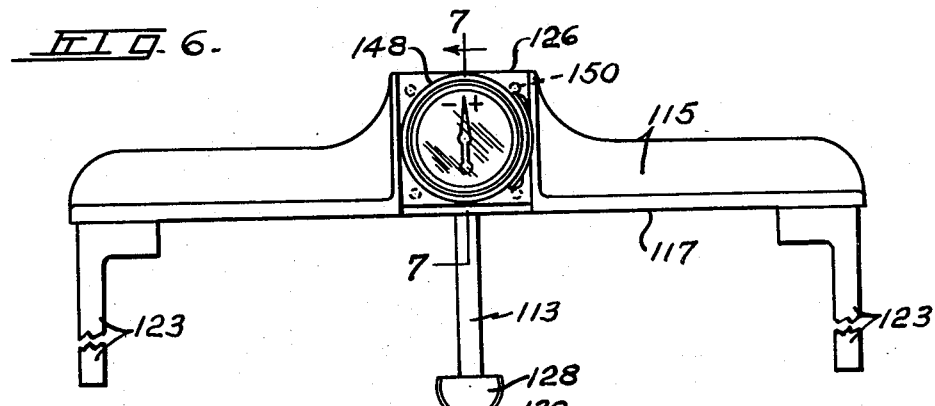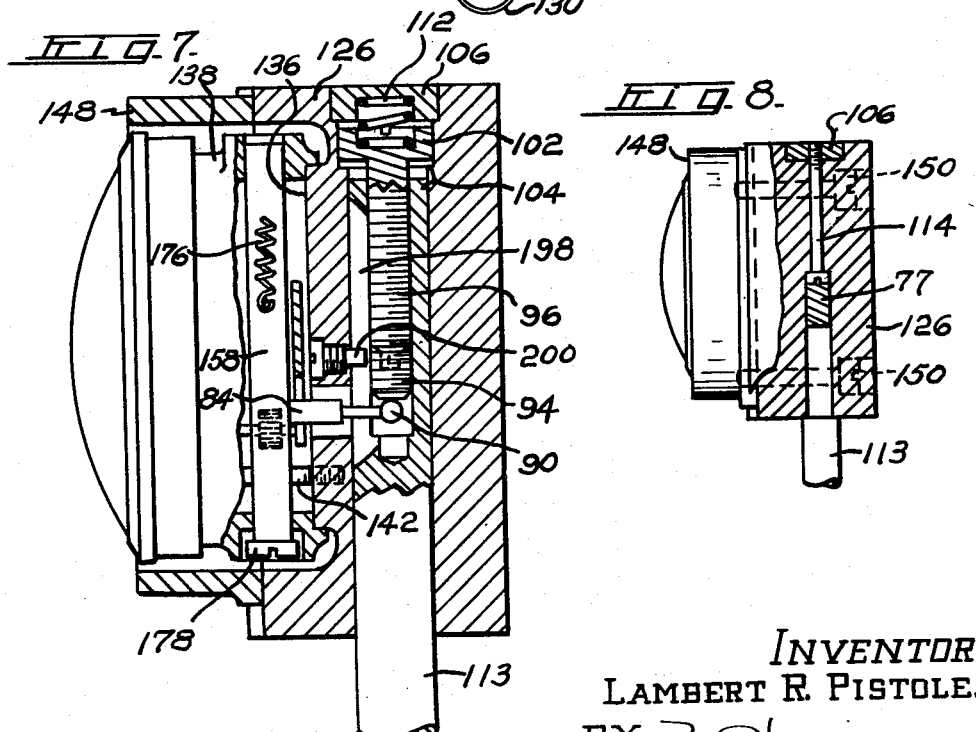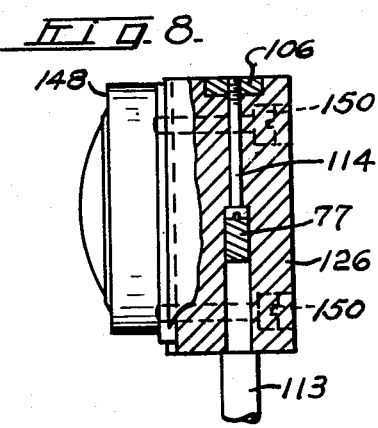
INVENTOR
LAMBERT R. PISTOLES
BY
ATTORNEY

2,610,409

UNITED STATES PATENT OFFICE 2,610,409

GAUGE

Lambert R. Pistoles, Wilmington, Del.

Application November 30, 1948, Serial No. 62,737

20 Claims. (Cl. 33—172)

This invention relates to gages, and more particularly to gages operating through a dial indicator.

In copending applications Serial No. 39,138, filed July 16, 1948, and Serial No. 30,069, filed May 29, 1948, there are shown flush pin gages of a novel form principally adapted to measuring lengths of turned bodies, depth, or generally distances between parallel surfaces. The gages therein shown are primarily adapted for flush pin manipulation, although application of a dial indicator is illustrated and described in the former.

The present invention is directed to the adaptation of a dial indicator to the gages of the type above referred to, the adaptation being effected in a rugged manner, readily adjustable and such that accurate indication of length may be quickly observed.

Accordingly, an object of the present invention is to provide a dial indicator in combination with a pin gage in a manner to provide assured accurate indications.

Another object of the invention is the adaptation of a dial indicator to a pin gage in which movement of the pin gage may be restricted to a desired range within the dial indicator range.

Still another object of the invention is the provision of a range of length adjustment for a pin gage of the type described, wherein the gage when adjusted may actuate a dial indicator for ease of observation.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a top plan view of a gage adapted for axial measurement of turned articles;

Figure 2 is a side elevation of the gage of Figure 1;

Figure 3 is an end elevation of the gage of Figure 1, with parts in section, taken on the line 3—3 of Figure 2;

Figure 4 is a longitudinal enlarged section taken substantially on the line 4—4 of Figure 1;

Figure 5 is a top plan view of a modified form of the invention applied to a depth gage;

Figure 6 is a side elevation of the gage of Figure 5;

Figure 7 is an enlarged section taken substantially on the line 7—7 of Figure 6; and Figure 8 is a section taken on the broken line 8—8 of Figure 5.

In Figures 1 to 4, inclusive, there is shown a gage comprising in general a block 10, having a shallow V face for engaging turned surfaces, a gage pin 12, and a dial indicator 14. The block 10 is provided with the dihedral face comprising the inclined faces 16 and 18, intersecting in a line 20, and end faces 22 and 24, accurately formed at right angles to said faces 16 and 18 and line 20. The block is provided with a bore 26 to slidingly receive the gage pin 12, the latter preferably having a disk 28 on its end having plane faces 30 and 32, at right angles to the pin. It will be observed that the block 10 is thus adapted to engage a turned surface such as A of a work piece, to thereby align the pin 12 in parallelism with the work axis, and the end face 24 engages a flange F, while the pin disk 28 engages a shoulder S, for gaging the distance between the flange F and shoulder S.

The upper side of the block 10 is provided with an annular recess 34, and raised circular deck 36, the latter being adapted to substitute for and be received in place of the circular back plate of a stock dial indicator of the type shown at 14. The dial indicator has a circular body or casing portion 38 having an annular shoulder 40 adapted to receive the raised deck 36, and the indicator is adapted to be held in place by through screws 42 and 44, the heads of which are seated in the dial plate 46, and threaded in the raised deck 36.

The dial indicator, for protection, is surrounded by an annular ring 48 having a rectangular flange 49 secured to the block 10 as by screws 50, such rectangular flange extending to the left and forming with an integral web 52 a T-sectioned extension arm for rigidly supporting a pin guide bracket 54. The web 52 merges with the ring 48 to form a rigid cantilever structure. As shown in application Serial No. 39,138, the rectangular flange may be secured to the block 10 so as to bear laterally against the side flange or shoulder 56, the surface of which is parallel with the gage pin axis, and adapted to cooperate with the extension arm so as to provide perfect alignment of the pin aperture in bracket 54 with the pin bore 26.

The dial indicator shown includes the usual indicator rod 58, slidably positioned in apertured bosses 60 and 62. The rod has been reduced in length by removing a portion of the right hand end thereof as seen in Figure 4. The rod or pin is provided with rack teeth operating on a pinion 64, in turn actuating a dial hand 66 through the gear 68 and pinion 70. Slack take-up is provided by the gear 72 and hair spring 74, all as will be readily understood in the art. The rod is biased to move to the right by a tension spring 76 also connected to the casing 38, and movement of the rod is limited by the shoulder formed by the screw head 78.

The bearing plate 80 within the indicator is slotted as at 82, to provide access to the dial rod 58 and permit the rigid insertion into such rod of a ball head actuating pin 84. The pin has a reduced shank portion 86, and may be secured in the rod by any suitable means such as a driven or screw thread fit. The pin extends through an aperture 88 in the deck 36 to intersect the pin bore 26, and the ball head 90 is so located as to lie on the axis of the bore.

The pin is provided with a concentric bore 92 from its end, which is threaded to receive adjustable threaded members in the form of a socket head set screw 94, and locking screw 96. The pin is also slotted from the end as by milling to permit the ball head and shank portion 86 to extend into the pin so that the ball head may bear against the transverse end surface of the socket head set screw 94. The slot 98 is of greater width than the shank diameter of the ball head pin, and is adapted to engage a key pin 100 having a press fit in the gage body 10, and of a diameter to closely fit the slot 98, and keep the gage rod from turning, thus maintaining clearance around the shank 86.

The locking screw 96 has a dual function, in that the head 102 thereof is adapted to limit travel of the gage pin by engaging the shoulder 104, or a transverse bar 106, secured in a suitable complementary channel in the back face 24 of the gage block 10. The bar 106 and the screw head 102 have opposed recesses 108 and 110, respectively, in which there is positioned a coil biasing spring 112. The bar 106 is secured to the block by a pair of spaced screws such as 114, the details of which are more clearly shown in Figures 3 and 5, which are entirely similar in this respect.

Suitable means are provided for locking the bezel in position, as by the set screw 116 threaded in the annular guard ring 48, and a suitable indicia label 118 bearing data respecting the gage setting may be secured to the ring, thus covering such set screw to prevent tampering therewith. Additionally, the bores in which the screws 114 are positioned may be filled with beeswax 77, it being apparent from the structure described that once the gage and gage pin have been set, access to the adjustments thereof are effectually blocked or sealed by the beeswax and hidden bezel screw.

In the arrangement shown in Figures 5-8, considerable similarity to Figures 1 to 4 is present, the gage, however, being applied to a block adapted for use in depth gaging and similar or related operations. In this form, there is provided a rigid frame 115 having a true plane gaging face 117, rigid channel arms 119 and a central dial indicator and gage pin supporting block section 126. The gage frame 115 may be variously fitted with brackets 123 to accommodate various gaging problems, and the pin 113 may have a ball tip, or the equivalent thereof, as illustrated in the disk segment 128 having a spherical surface 130.

The block section 126 has circular deck 136 adapted to receive the circular body or casing portion 138 of the dial indicator, the indicator being held in position as by screws 142. Protection is afforded the dial indicator by the flanged guard ring 148 secured to the block as by screws 150. The indicator rod 158 as previously, is biased by a tension spring 176, and is provided with a movement limiting shoulder in the form of a screw head 178.

As described in Figures 1 to 4, the rod is provided with a ball head pin 84, the ball head end 90 of which engages a socket head set screw 94 and locking screw 96. The gage pin is provided with a milled slot 198, closed at the end, and which cooperates with a key screw 200. The remaining parts are similar to those described in the form shown in Figures 1 to 4, and function in a like manner.

In practice, it will be appreciated that a limited movement of the dial indicator bar 58 will effect rotation of the indicator hand 66, and that it is desirable to limit rotation of the hand to less than 360°, or less than 180° above or below the zero setting to avoid possible error in reading the gage. The range of movement of the hand is accurately governed by the thickness of the head 102 of the lock screw 96, in its travel between the shoulder 104 and bar 106. It will of course be apparent that by varying the head thickness, such travel may be varied to match the travel with the sensitivity of the gage selected.

A gage of the type described will in practice be supplied with pins of varying lengths varying, for example, in half inches, and lock screws having differing head thicknesses will be provided. In adjusting the gage for use, the socket head set screw 94 will be properly positioned in the pin 12 to provide a zero dial indication when the gage pin and block are contacted with correctly spaced work surfaces to be gaged. The lock screw having head thickness to match the desired dial hand travel is selected and positioned in place behind the set screw, the bar 106 positioned and secured in place by the screws 114. Should the lock screw pressure on set screw 94 cause a slight shift, the gage dial may be rotated to zero by rotating the bezel, and thereafter locked by screw 116. The gage is thus set and ready for use.

In the form shown in Figures 1 to 4, end plates 23 and 25 are shown fastened to the gage block by suitable screws arranged in slots. The plates each have parallel faces, one of which lies against the end faces 22 and 24, respectively. The plate 25 may be moved to provide a gage face opposed to the face 24, or either plate may provide a parallel face suitably stepped to avoid a fillet, all as described in application Serial No. 39,138. The plate 23 may be secured by screws threaded into the ends of the bores receiving the screws 114 in the block 10.

It will thus be seen that a pin gage operable upon a dial indicator of rugged construction has been provided. While several modifications of the invention have been shown and described, it is to be understood that the invention is not limited thereto. As many variations in use and operation and changes in construction and arrangement may be made without departing from the spirit of the invention, as will be apparent to those skilled in the art, reference will be had to the appended claims for a definition of the limits of the invention.

What is claimed is:

1. In a gage, a gage block having a gaging surface and work-engaging surfaces at right angles thereto, a bore therein normal to said gaging surface, a slidable gage pin in said bore having a gaging end surface, means for mounting a dial indicator on said block laterally with respect to said pin, means for limiting the axial movement of said pin, and means supported by the dial indicator for transmitting movement of the pin to the dial operating mechanism of said indicator said means comprising ball contacting means located on the center line of said pin.

2. In a gage, a gage block having a gaging surface and work-engaging surfaces at right angles thereto, a bore therein normal to said gaging surface, a slidable gage pin in said bore having a gaging end surface, means for mounting a dial indicator on said block laterally with respect to said pin, means for limiting the axial movement of said pin, means supported by the dial indicator for transmitting movement of the pin to the dial operating mechanism of said indicator said means comprising ball contacting means located on the center line of said pin, and means coaxially arranged with respect to the pin for resiliently biasing the pin in one direction.

3. In a gage, a gage block having a gaging surface, a bore therein normal to said surface, a slidable gage pin in said bore having a gaging end surface, means for mounting a dial indicator having a slidable bar on said block, with the bar extending parallel with the pin, means rigid with the bar for transmitting movement of the pin and including ball contacting means located on the center line of said pin, means for limiting movement of the pin to a range embracing the dimension to be gaged and the tolerances thereof and means for axially shifting said last-named means with respect to said pin.

4. In a gage, a gage block having a gaging surface, a bore therein normal to said surface, a slidable gage pin in said bore having a gaging end surface, means for mounting a dial indicator having a slidable bar on said block, with the bar extending parallel with the pin, means transmitting movement of the pin to said bar including a ball contact on the pin axis, means for limiting movement of the pin to a range embracing the dimension to be gaged and the tolerances thereof, means for axially shifting said last-named means with respect to said pin and means for resiliently biasing the pin in one direction.

5. In a gage, a gage block having a gaging surface, a bore therein normal to said surface, a slidable gage pin in said bore having a gaging end surface, means for keying said pin against rotation, means for mounting a dial indicator on said block laterally with respect to said pin, means for limiting the axial movement of said pin, and means including a ball point lying on the pin axis for transmitting movement of the pin to the dial operating mechanism of said indicator.

6. In a gage, a gage block having a gaging surface, a bore therein normal to said surface, a slidable gage pin in said bore having a gaging end surface, means for keying said pin against rotation, means for mounting a dial indicator on said block laterally with respect to said pin, means for limiting the axial movement of said pin, means for transmitting movement of the pin to the dial operating mechanism of said indicator including a ball contact on the pin axis, means for setting said pin relative to said bar and means for resiliently biasing the pin in one direction.

7. In a gage, a gage block having a gaging surface, a bore therein normal to said surface, a slidable gage pin in said bore having a gaging end surface, means for keying said pin against rotation, means for mounting a dial indicator having a slidable bar on said block, with the bar extending parallel from the pin including a ball point contact lying substantially on the pin axis, means for transmitting movement to said bar with the pin, means coaxial with the pin for biasing the pin and means for limiting movement of the pin to a range embracing the dimension to be gaged and the tolerances thereof.

8. In a gage, a gage block having a gaging surface, a bore therein normal to said surface, a slidable gage pin in said bore having a gaging end surface, means for keying said pin against rotation, means for mounting a dial indicator, with the bar having a slidable bar on said block, means for transmitting parallel with the pin, means for transmitting movement to said bar from the pin including a ball contact coaxial with said pin, means for limiting movement of the pin to a range embracing the dimension to be gaged and the tolerances thereof, means for axially shifting said last-named means with respect to said pin and means for resiliently biasing the pin in one direction.

9. In a gage, a gage block having a gaging surface, a bore therein normal to said surface, a slidable gage pin in said bore having a gaging end surface and an axially extending key slot, means for mounting a dial indicator on said block laterally with respect to said pin, means for limiting the axial movement of said pin, and means for connecting the pin to the dial operating mechanism of said indicator, said connecting means comprising an axially adjustable screw coaxially positioned in said key slot in said pin, and an arm terminating in a contact ball extending from the dial indicator operating mechanism into said key slot.

10. In a gage, a gage block having a gaging surface, a bore therein normal to said surface, a slidable gage pin in said bore having a gaging end surface and an axially extending key slot, means for mounting a dial indicator on said block laterally with respect to said pin, means for limiting the axial movement of said pin, means for connecting the pin to the dial operating mechanism of said indicator, and means for resiliently biasing the pin in one direction, said connecting means comprising an axially adjustable screw coaxially positioned in said key slot in said pin, and an arm terminating in a contact ball extending from the dial indicator operating mechanism into said key slot.

11. In a gage, a gage block having a gaging surface, a bore therein normal to said surface, a slidable gage pin in said bore having a gaging end surface and an axially extending key slot, means for mounting a dial indicator having a slidable bar on said block, with the bar extending parallel with the pin, means connecting said bar with the pin, and means for limiting movement of the pin to a range embracing the dimension to be gaged and the tolerances thereof, said connecting means comprising an axially adjustable screw coaxially positioned in said key slot in said pin, and an arm terminating in a contact ball extending from the dial indicator operating mechanism into said key slot.

12. In a gage, a gage block having a gaging surface, a bore therein normal to said surface, a slidable gage pin in said bore having a gaging end surface and an axially extending key slot, means for mounting a dial indicator having a slidable bar on said block, with the bar extending parallel with the pin, means connecting said bar with the pin, means for limiting movement of the pin to a range embracing the dimension to be gaged and the tolerances thereof and means for resiliently biasing the pin in one direction, said connecting means comprising an axially adjustable screw coaxially positioned in said key slot in said pin, and an arm terminating in a contact ball extending from the dial indicator operating mechanism into said key slot.

13. In a gage, a gage block having a gaging surface, a bore therein normal to said surface, a slidable gage pin in said bore having a gaging end surface and an axially extending key slot, means for keying said pin against rotation, means for mounting a dial indicator on said block laterally with respect to said pin, means for limiting the axial movement of said pin, and means for connecting the pin to the dial operating mechanism of said indicator, said connecting means comprising an axially adjustable screw coaxially positioned in said key slot in said pin, and an arm terminating in a contact ball extending from the dial indicator operating mechanism into said key slot.

14. In a gage, a gage block having a gaging surface, a bore therein normal to said surface, a slidable gage pin in said bore having a gaging end surface and an axially extending key slot, means for keying said pin against rotation, means for mounting a dial indicator on said block laterally with respect to said pin, means for limiting the axial movement of said pin, means for connecting the pin to the dial operating mechanism of said indicator, and means for resiliently biasing the pin in one direction, said connecting means comprising an axially adjustable screw coaxially positioned in said key slot in said pin, and an arm terminating in a contact ball extending from the dial indicator operating mechanism into said key slot.

15. In a gage, a gage block having a gaging surface, a bore therein normal to said surface, a slidable gage pin in said bore having a gaging end surface and an axially extending key slot, means for keying said pin against rotation, means for mounting a dial indicator having a slidable bar on said block, with the bar extending parallel with the pin, means connecting said bar with the pin, and means for limiting movement of the pin to a range embracing the dimension to be gaged and the tolerances thereof, said connecting means comprising an axially adjustable screw coaxially positioned in said key slot in said pin, and an arm terminating in a contact ball extending from the dial indicator operating mechanism into said key slot.

16. In a gage, a gage block having a gaging surface, a bore therein normal to said surface, a slidable gage pin in said bore having a gaging end surface and an axially extending key slot, means for keying said pin against rotation, means for mounting a dial indicator having a slidable bar on said block, with the bar extending parallel with the pin, means connecting said bar with the pin, means for limiting movement of the pin to a range embracing the dimension to be gaged, and the tolerances thereof, and means for resiliently biasing the pin in one direction, said connecting means comprising an axially adjustable screw coaxially positioned in said key slot in said pin, and an arm terminating in a contact ball extending from the dial indicator operating mechanism into said key slot.

17. In a gage, a gage block having a gaging surface at one end, a bore therein normal to said surface, a slidable gage pin in said bore having a gaging end surface, a dial indicator mounted on one side of said block, means for transmitting movement of said pin to said indicator including contact means lying on the pin axis, and a shallow dihedral constituting the opposite side of said block for contacting a turned surface along spaced line contacts with the axis of said gage pin parallel with the axis of said turned surface.

18. In a gage, a gage block adapted to engage a curved surface of generation along spaced elemental lines of contact, a bore in said block having its axis parallel to the axis of said elemental lines, a gage pin slidable in said bore, a dial indicator having an actuating rod mounted on said block with its rod extending parallel with said pin, means forming an axial adjustable abutment on said pin, a ball end pin fixed to said rod with the ball end bearing against said abutment, and means biasing said gage pin abutment against said ball end.

19. In a gage, a gage block adapted to engage a curved surface of generation along spaced elemental lines of contact, a bore in said block having its axis parallel to the axis of said elemental lines, a gage pin slidable in said bore, a dial indicator having an actuating rod mounted on said block with its rod extending parallel with said pin, means forming an axial adjustable abutment on said pin, a ball end pin fixed to said rod with the ball end bearing against said abutment, means biasing said gage pin abutment against said ball end, and means for limiting the travel of said gage pin to a range slightly less than a turn of the indicator of said dial indicator.

20. In a gage, a gage block adapted to engage a curved surface of generation along spaced elemental lines of contact, a bore in said block having its axis parallel to the axis of said elemental lines, a gage pin slidable in said bore, a dial indicator having an actuating rod mounted on said block with its rod extending parallel with said pin, means forming an axial adjustable abutment on said pin axially located in a threaded bore in said gage pin, a slot in the gage pin leading to said abutment, a ball end pin fixed to said rod and extending through said slot with the ball end bearing against said abutment, means biasing said gage pin abutment against said ball end, and means for limiting the travel of said gage pin to a range slightly less than a turn of the indicator of said dial indicator.

LAMBERT R. PISTOLES.

REFERENCES CITED

The following references are of record in the file of this patent:

UNITED STATES PATENTS

| Number | Name | Date |
| --- | --- | --- |
| 742,077 | Sovelius | Oct. 20, 1903 |
| 1,194,835 | Gordon | Aug. 15, 1916 |
| 1,334,999 | Haley | Mar. 30, 1920 |
| 1,625,766 | Simpson | Apr. 19, 1927 |